R. L. WARBURTON & H. WOLFE.
VEHICLE SIGNAL.
APPLICATION FILED OCT. 9, 1914.
1,165,472.
Patented Dec. 28, 1915.
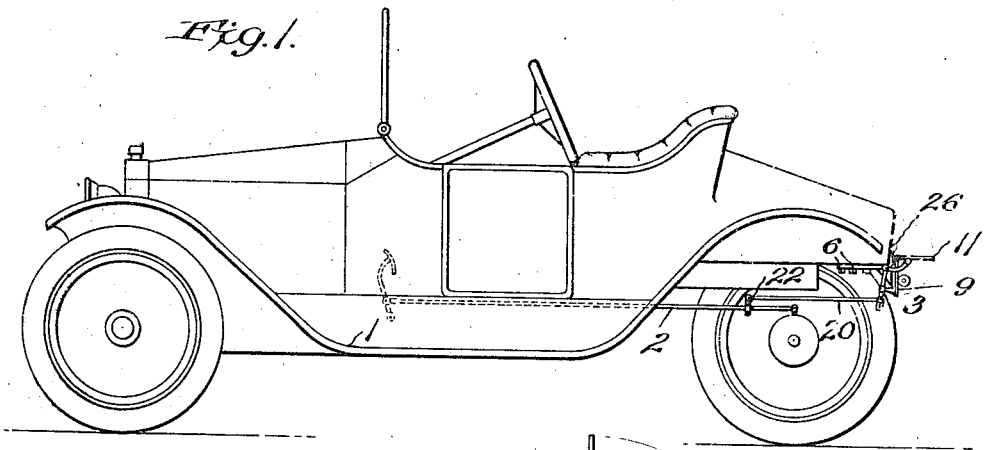
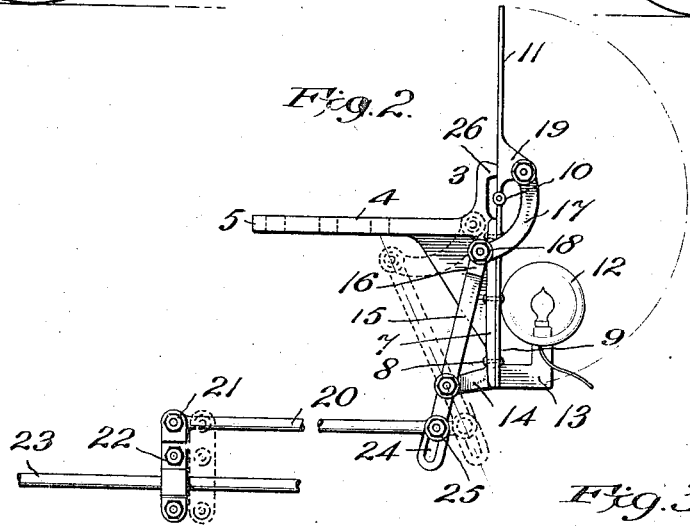
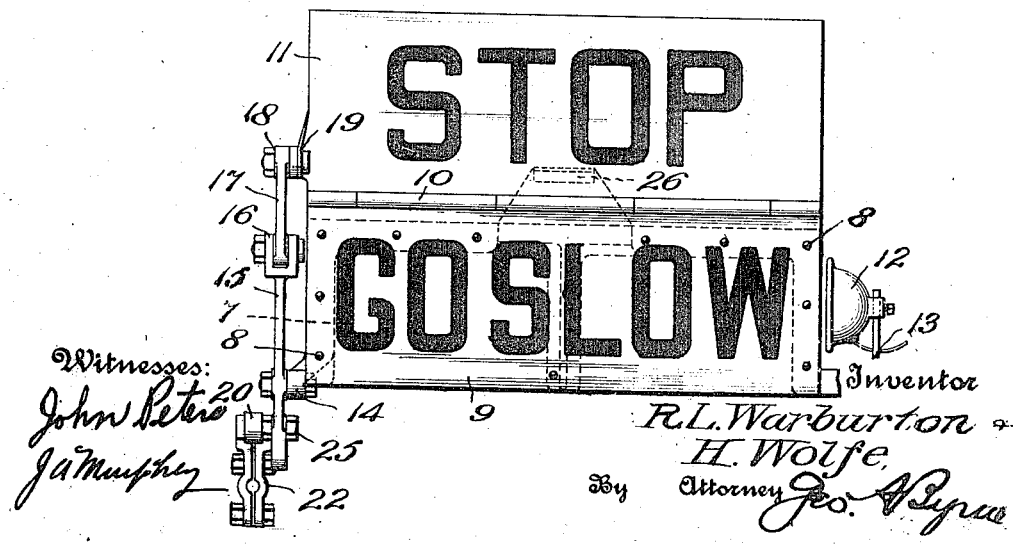

UNITED STATES PATENT OFFICE.

ROBERT L. WARBURTON AND HARRY WOLFE, OF NEWARK, NEW JERSEY.

VEHICLE-SIGNAL.

1,165,472.

Specification of Letters Patent. Patented Dec. 28, 1915.

Application filed October 9, 1914. Serial No. 865,865.

*To all whom it may concern:*

Be it known that we, ROBERT L. WARBURTON and HARRY WOLFE, citizens of the United States, and residents of Newark, in the county of Essex and State of New Jersey, have invented certain new and useful Improvements in Vehicle-Signals, of which the following is a specification.

provements in Vehicle-Signals, of which the following is a specification.

The general object of this invention is to provide an automobile or like vehicle with a signaling means whereby the operator or driver of the vehicle may readily signal any desired instructions or warnings to the drivers or operators of following vehicles. And to this end the invention consists in providing a stationary signal and a movable signal for concealing and exposing the stationary signal and in providing means for connecting the movable signal with the braking mechanism of an automobile, so that upon the partial application of the brakes the stationary signal is exposed and that upon the full application of the brakes the movable signal is exposed.

Other objects will appear and be better understood from that embodiment of which the following is a specification, reference being had to the accompanying drawings forming a part hereof, in which—

Figure 1 is a side elevation view of an automobile showing the application of the invention thereto; Fig. 2 is a side elevational view of the invention shown connected to a portion of the brake operating rod, and Fig. 3 is a front elevational view of the invention.

Referring to the drawings in detail, 1 indicates an automobile of the ordinary type, 2 the usual braking mechanism therefor and 3 the signaling device preferably secured to the rear end of the automobile body as shown.

The signaling device comprises a bracket 4 having a horizontally arranged portion 5 which, by means of the bolts 6, is secured to the automobile body at a position where the device may be distinctly visible to those in the rear of the automobile. The bracket is provided at one end with a vertically arranged depending frame portion 7 to which is secured, by means of the rivets 8, a stationary plate 9 on which the signal term "Go slow" is arranged. Hingedly connected to the upper end of the plate 9, as indicated at 10, is a swinging plate 11 on which the signal term "Stop" is arranged. These plates are arranged so as to be folded one upon the other and have their signal terms provided on their opposed faces, the terms being preferably formed in heavy capital letters, so they may be distinctly seen by one when they are brought to a readable position by the actuation of the breaking mechanism of the vehicle.

It is to be understood that the device may, if desired, be secured to the vehicle body in such a position that the rays of light emanating from the usual tail lamp of the vehicle may be utilized for illuminating the device at night. If such illuminating means is not desirable the device may be equipped with its own illuminating means such as an electric lamp 12, which may be carried on a bracket 13 projecting from one side of the frame 7. The lamp is preferably arranged approximately at the central portion of the stationary plate so that the rays of light emanating therefrom will not be affected by the swinging plate, for shading the stationary plate when the swinging plate is in approximately its horizontal position.

Projecting rearwardly from one corner of the vertical portion 7 of the bracket is a bearing 14 on which is pivotally mounted an operating lever 15. The upper end of this lever is forked as at 16 so as to have pivotally connected therein one end of a link 17, the other end of which is pivotally connected as at 18 to a projection 19 formed on one side of the swinging plate 11. To the lower end of the operating lever is pivotally connected to one end of a rod 20 the other end of which is connected as at 21 to a tie piece or clamp 22 by means of which the signaling device may be readily connected to and be automatically operated by the brake rod 23 when the braking mechanism is actuated.

The lower end of the operating lever 15 is slotted as indicated at 24 so that a slight adjustment of the operating lever may be effected to suit the requirements of the various makes of automobiles to which the device may be applied. A nut 25 serves to lock the parts after they have once been set in their proper adjusted position.

When the device has been properly applied to an automobile, and the automobile is progressing along the highway under normal conditions, the swinging plate is normally in its lowermost or inoperative position, that is, the same is swinging down so as to cover or conceal the stationary plate. Now when the driver operates the brake lever to slow down the automobile, the operating lever 15, through its connection with the brake rod 23 is forced to swing upon its pivot and through the link connection 17 the swinging plate is swung to substantially a horizontal position thus uncovering the stationary plate and exposing to view the signal "Go slow". Now when the driver operates the brake lever to stop the automobile the swinging plate is swung to its uppermost position thus exposing to view the signal "Stop". To limit the upward movement of the swinging plate so as to prevent the lever and link connection from going over the center, a projection or stop 26 is provided on the bracket as shown. This stop projects upwardly from the end of the bracket and is arranged so as to be engaged by the back of the swinging plate when the same has been swung to its uppermost or vertical position. When the brakes are released the operating lever 15 will retract and thus through the link connection 17, the movable plate will be actuated so as to be returned to its lowermost or inoperative position.

From the foregoing description it is obvious that a simple and inexpensive signaling device with but comparatively few parts has been provided and that the same may be readily attached and detached, with but comparatively little trouble, to any of the well known makes of automobiles now on the market.

It is obvious that those skilled in the art may vary the details of construction and arrangements of parts without departing from the spirit of our invention and therefore we do not wish to be limited to such features except as may be required by the claim.

What we claim is—

A signal for vehicles comprising a supporting bracket adapted to be mounted on the vehicle, a plate fixedly mounted on said bracket, a second plate hingedly mounted on said fixed plate at its upper end and adapted to fold against and conceal a face of said fixed plate, a stop secured to said bracket to limit the movement of said movable plate in one direction, said fixed and movable plates marked with signal terms, a bearing secured to said bracket, a lever arm fulcrumed on said bearing intermediate its ends, a projecting member on the hinged plate, a link connecting said projecting member with one end of the lever arm, and a rod connected to the other end of the said lever, said rod adapted on partial movement to operate the hinge plate to expose the signal term on the fixed plate and on completed movement to expose the signal term on the movable plate.

Signed at Newark, in the county of Essex and State of New Jersey, this third day of October, A. D. 1914.

ROBERT L. WARBURTON.
HARRY WOLFE.

Witnesses:
WILLIAM H. BEIDELMAN,
EMILY E. CYPHERS.